USOO5551591A

United States Patent [19]
Laib

[11] Patent Number: 5,551,591
[45] Date of Patent: Sep. 3, 1996

[54] SINK CONTAINER

[75] Inventor: Douglas M. Laib, Kissimmee, Fla.

[73] Assignee: Dart Industries Inc., Deerfield, Ill.

[21] Appl. No.: 249,601

[22] Filed: May 27, 1994

[51] Int. Cl.⁶ .............. B65D 25/30; B65D 25/08; B65D 3/04; B65D 3/26
[52] U.S. Cl. ............ 220/528; 220/572; 220/735; 206/804
[58] Field of Search ................. 220/528, 572, 220/571.1, 735, 736, 752, 759; 206/804

[56]  References Cited

U.S. PATENT DOCUMENTS

| D. 139,569 | 5/1944 | O'Brien . |
| 1,337,477 | 4/1920 | Knapp . |
| 1,517,164 | 3/1922 | Lear . |
| 2,712,668 | 6/1951 | Thiele . |
| 3,070,226 | 12/1962 | Mathison ............. 220/528 X |
| 3,363,794 | 1/1968 | Dearing ............... 206/804 X |
| 3,458,078 | 7/1969 | Skidmore ............. 206/804 X |
| 4,179,040 | 12/1979 | Bateman et al. . |
| 5,082,135 | 1/1992 | DeCoster . |

Primary Examiner—Allan N. Shoap
Assistant Examiner—Niki M. Kopsidas
Attorney, Agent, or Firm—John A. Doninger

[57] ABSTRACT

A drainage container including a receptacle having an upwardly opening interior chamber and a support platform positioned in closely spaced relation above the chamber bottom. An upwardly projecting handle panel is fixed to the platform and extends upwardly beyond the chamber mouth. The handle panel and support platform are releasably retained within the chamber by a rim member releasably mounted to the receptacle about the mouth and projecting inwardly thereof to form an abutment engaged downwardly against opposed shoulders on the handle panel.

20 Claims, 4 Drawing Sheets

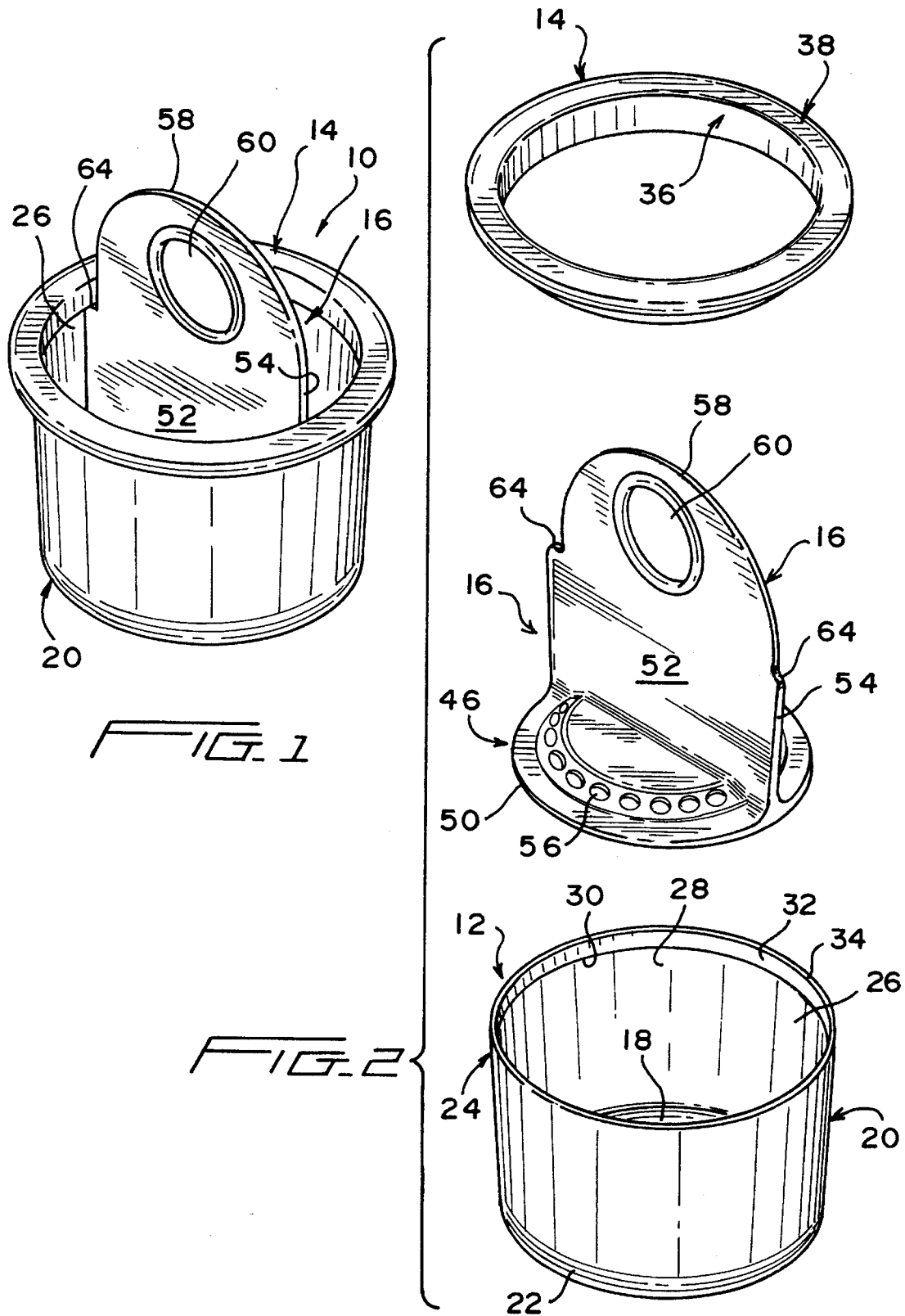

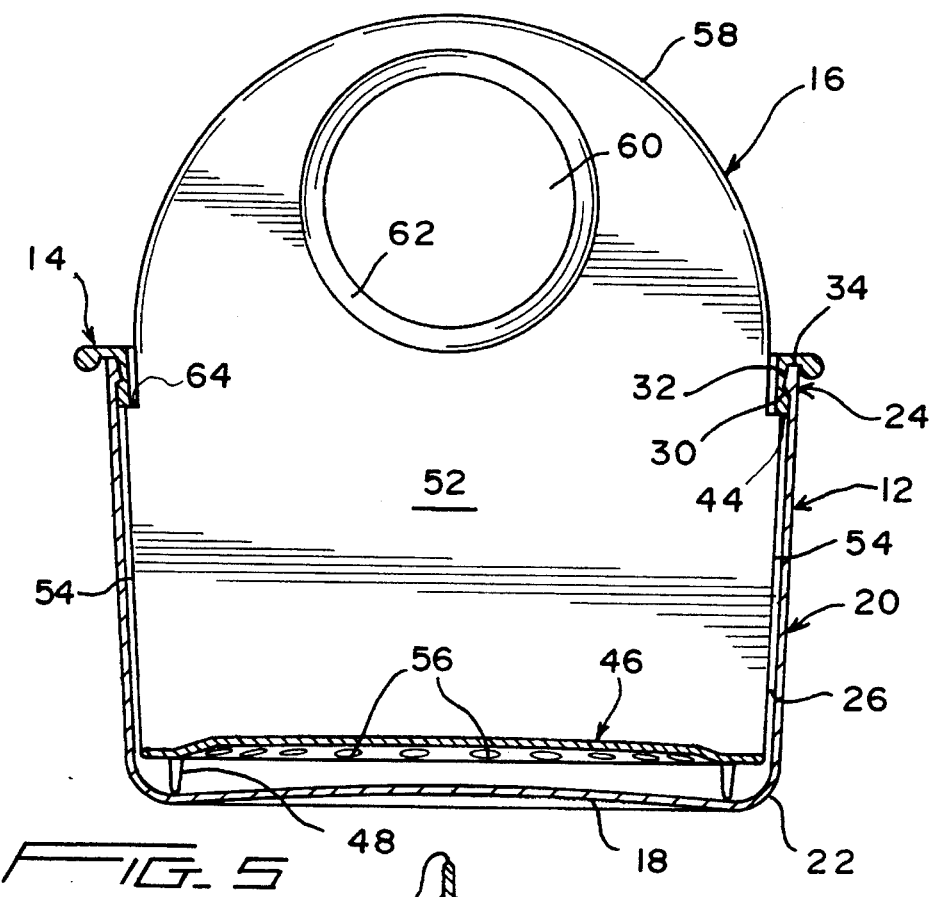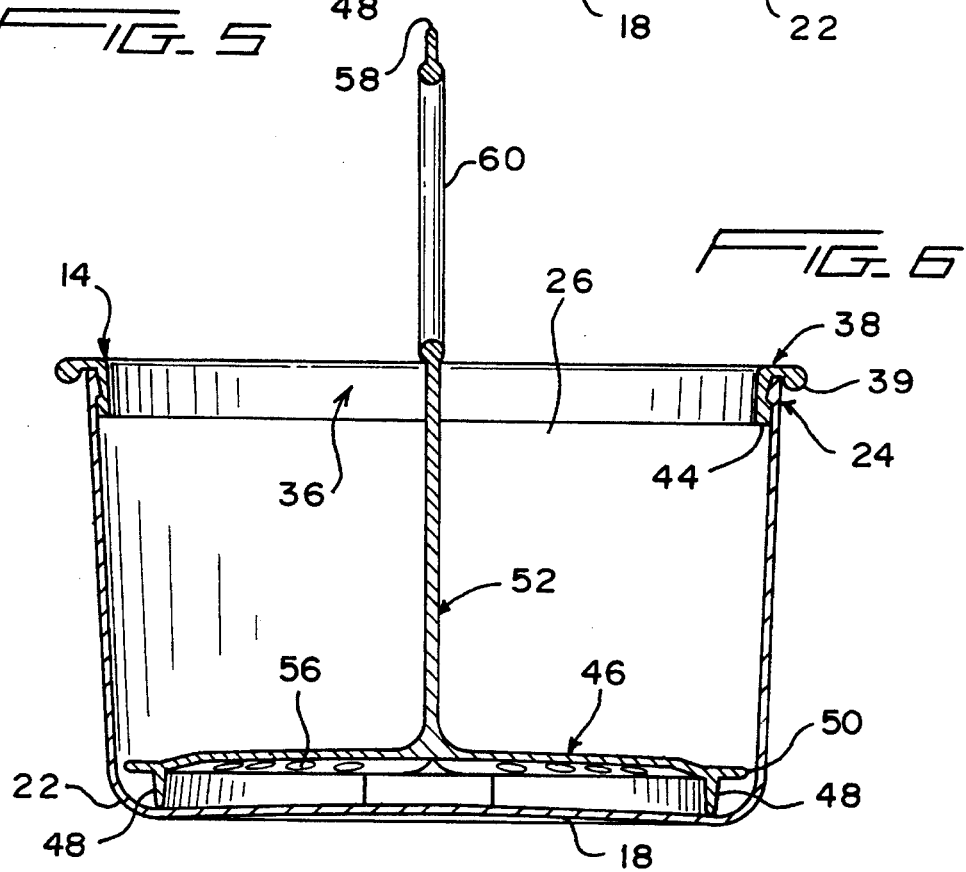

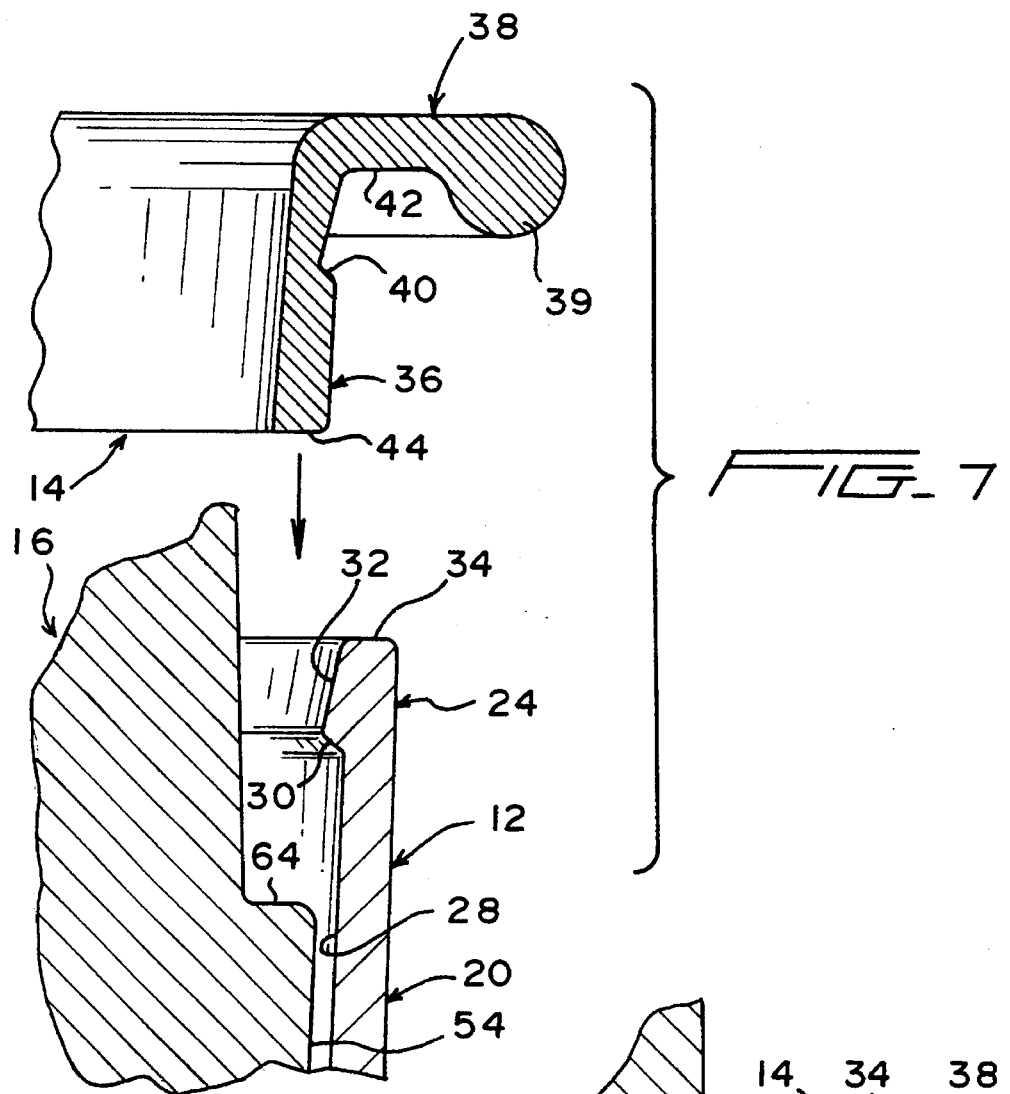
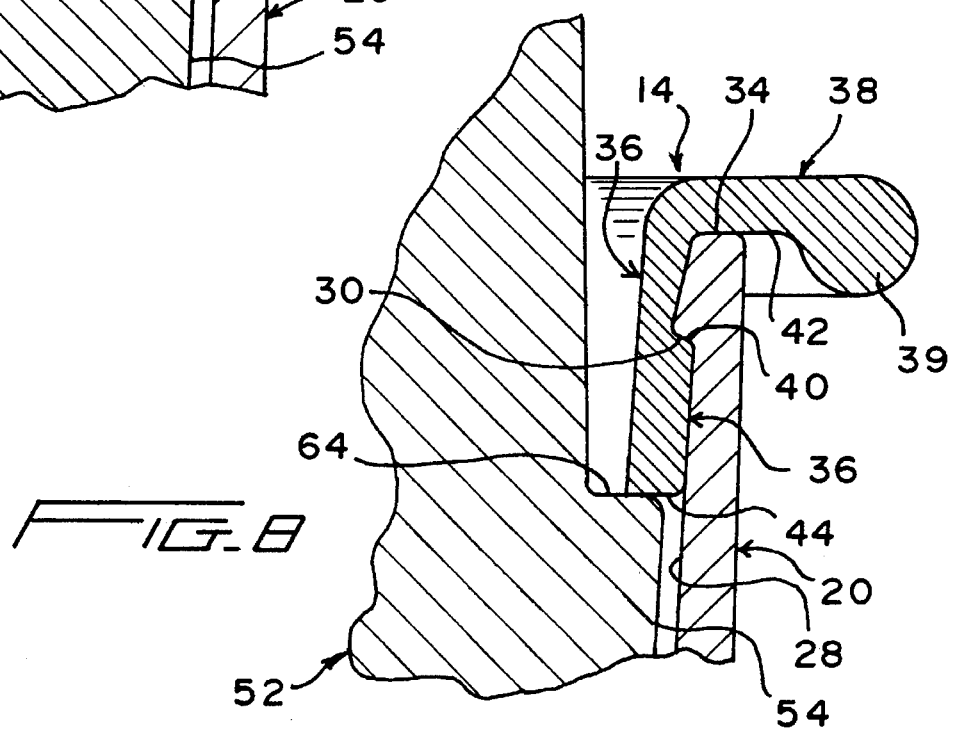

SINK CONTAINER

BACKGROUND OF THE INVENTION

The invention broadly relates to the storage of hand-held scrubbing implements such as normally used with water and/or other cleaning liquids both in and around kitchen sinks, laundry tubs, bathroom fixtures, and the like. Such implements can include scrubbing brushes, bottle brushes, sponges, scouring pads, etc.

By their very nature, such implements are normally stored while still wet or damp. Conventionally, the wet implement will be left in the sink, on an adjacent drainage board, or in a cabinet beneath the sink, preferably within a bucket. In each instance, the implement sits within a wet pool as the liquid drains therefrom. This is not only undesirable because the drying process is extended, but also is not particularly sanitary and could be a potential health hazard.

SUMMARY OF THE INVENTION

The present invention provides a drainage container or bucket for compactly storing wet-scrubbing implements in a convenient manner wherein provision is made for the liquid to drain away from the implements, thus accelerating the drying of the implements and achieving the various advantages to be derived therefrom.

The drainage container includes an open topped receptacle with a removable partition therein. The partition includes an apertured support platform positioned within the receptacle in spaced relation above the base for the elevated support of the various implements in a manner which allows liquid to drain downwardly away from the implements to a separate subjacent area.

In order to allow for a convenient handling of the container and also provide for a releasable retention of the support platform within the receptacle, the platform is provided with a panel extending transversely across the platform, bisecting the interior of the receptacle and projecting upwardly therefrom beyond the open mouth of the receptacle to define a handle. The upper portion of the panel includes an aperture therethrough to provide a convenient grip means for a user's hand. At a point slightly below the rim of the receptacle, the opposed side edges of the handle panel are provided with upwardly directed shoulders. These shoulders engage beneath an inner peripheral flange of a rim element or member which snap locks to the rim of the receptacle. The flange projects slightly inward of the inner face of the receptacle wall completely thereabout and acts to engage the panel shoulders and preclude withdrawal of the partition from the receptacle. In this manner, the entire drainage container, either with or without the implements received therein, can be picked up and moved to a stored position, for example under the sink.

It will of course be necessary to periodically clean the drainage container or empty what liquid might have accumulated therein. This is easily effected by an unsnapping of the rim member which removes the shoulder engaging abutment defined by the rim member flange. This allows for an upwardly sliding of the partition, including the support platform, from the receptacle. The smooth walled receptacle chamber is then easily emptied and cleaned, as is the partition itself.

It will thus be appreciated that the handle panel has multiple functions, including acting as a means for carrying the entire container, as a means for separating the support platform from the container, and as a means for dividing the receptacle chamber in two compartments for maintaining a separation of stored items as might be desired.

Additional features and advantages of the invention will become apparent as the details of construction and manner of use are more fully hereinafter described and claimed.

BRIEF DESCRIPTION OF THE DRAWINGS

FIG. 1 is a perspective view of the container of the invention;

FIG. 2 is an exploded perspective view of the three components of the container;

FIG. 5 is a transverse cross-sectional view taken substantially on line 5—5 in FIG. 3;

FIG. 6 is a transverse cross-sectional view taken substantially on line 6—6 in FIG. 3;

FIG. 7 is an enlarged cross-sectional detail illustrating the rim member aligned for releasable locking to the receptacle rim for retention of the partition; and FIG. 8 is a cross-sectional detail similar to FIG. 7 wherein the rim member is engaged and in abutment with the partition for retention thereof.

DESCRIPTION OF PREFERRED EMBODIMENTS

Figure 3:
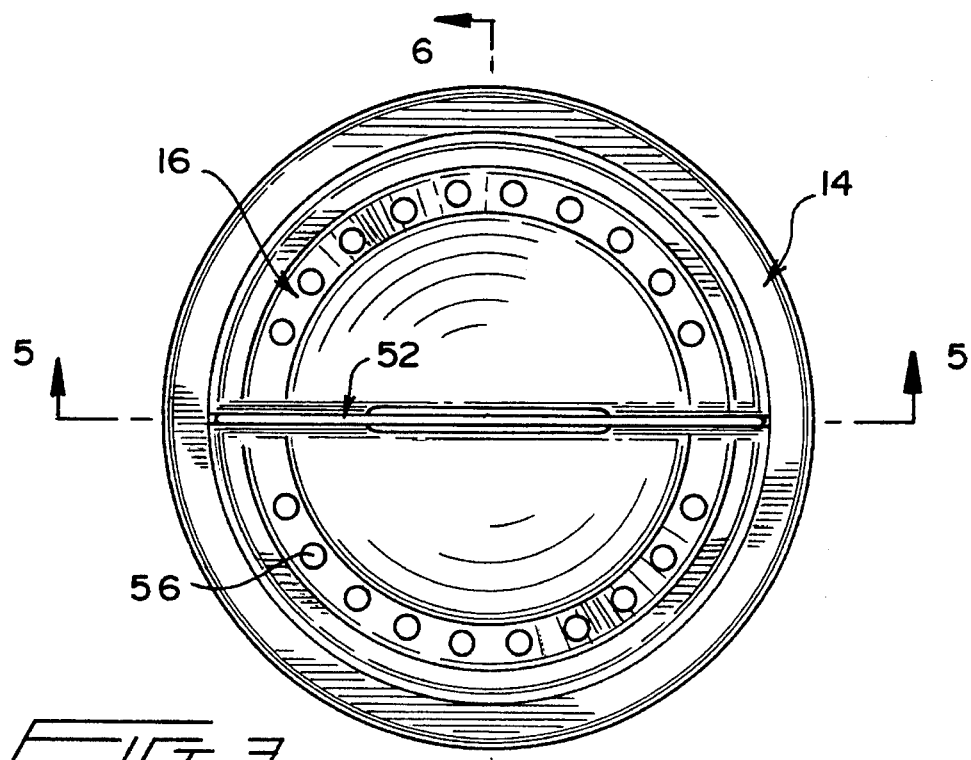
FIG. 3 is a top plan view of the assembled container.

Referring now more specifically to the drawings, the by the sink container, or drainage container is generally designated by reference numeral 10 and comprises three preformed components, a receptacle 12, a rim element or member 14, and a partition 16. The components are each made of an appropriate synthetic resinous material, with the receptacle and partition preferably being rigid or of minimal flexibility, and with the rim member 14 having a sufficient degree of resilient flexibility as to enable a releasable snap-locking to the receptacle as shall be explained subsequently.

The receptacle 12 includes a base or bottom 18, preferably slightly inwardly convex for stable positioning on a support surface. An upwardly extending wall 20 is integrally formed with the outer periphery of the base 18, normally with an arcuate transition corner area 22 therebetween, and terminates in an upper rim portion 24 which defines an open receptacle mouth remote from the base.

The receptacle 12 defines an upwardly opening chamber 6 which receives the partition 16. The inner surface 28 of the receptacle wall may flare slightly upwardly from the base to the rim portion to facilitate introduction of the partition 16. This inner surface is smooth and uninterrupted upwardly from the base 18 to the rim portion 24. At the rim portion 24, the inner configuration of the wall 20 includes a snap-lock retaining component having an inwardly extending and downwardly directed shoulder 30 with a beveled inner face 32 extending from the shoulder 30 to the extreme upper edge 34 of the receptacle wall 20. This snap-lock component 30, 32 is integrally defined with the wall 20 and extends peripherally thereabout.

The rim element or member 14 includes a depending inner flange 36 and an integral laterally outwardly directed upper flange 38 terminating in an outer gripping bead 39. Both flanges are continuous and respectively dimensioned whereby the downwardly directed inner flange 36 lies against the inner face of the rim portion 24 of the receptacle 12, and the upper or outer flange 38 seats on the upper edge 34 of the receptacle wall 20.

The inner rim member flange 36 is specifically adapted to releasably snap lock to the rim portion 24 of the receptacle. As such, this flange is undercut, immediately adjacent to and for a distance downward of the upper flange 38 to define an upwardly directed shoulder 40 which, noting FIGS. 7 and 8, snap locks beneath the rim portion shoulder 30. These shoulders may taper slightly upward and inward relative to the interior of the receptacle to facilitate disengagement. The height of the undercut which defines the rim member shoulder 40 is such as to engage the undersurface 42 of the outer flange 38 on the upper edge 34 of the receptacle wall 20 when the snap lock components 30 and 40 are engaged. The beveled inner surface 32 of the rim portion 24 of the receptacle facilitates engagement of the rim member 14 in an obvious manner. With the rim member 14 engaged to the rim portion 24 of the receptacle wall 20, the lower flat edge 44 of the inner depending flange 36 defines a downwardly directed shoulder or abutment extending laterally inward from the inner surface 28 of the receptacle wall. The significance of this abutment 44 will be described subsequently.

The partition 16 comprises a support platform 46 which is positioned within the receptacle chamber 26 in overlying substantially parallel relation to the base 18 and supported in spaced relation thereabove by elongate spacer members 48 integral with the platform 46 and depending from the undersurface thereof generally parallel to and slightly inwardly spaced from the outer periphery or peripheral edge 50 of the platform 46. As illustrated, two such spacer members 48 may be provided with the opposed ends thereof spaced from each other at opposed areas of the platform 46.

The partition 16 further includes an upwardly extending handle panel 52 transversely across the platform 46 centrally thereof so as to in effect bisect the platform and the receptacle chamber 26. The handle panel is substantially planar and, at the joinder with the support platform, is of a transverse length equal to or substantially equal to the transverse dimension of the support platform 46. The opposed upwardly directed side edges 54 of the panel 52 substantially parallel the opposed portions of the inner surface 28 of the receptacle wall 20. That is, if the inner surface 28 is slightly upwardly tapered, the side edges 54 will preferably also be so tapered. Noting FIGS. 5–8, the outer peripheral edge 50 of the support platform 46, as well as the opposed upwardly directed side edges 54 of the handle panel 52, are slightly inwardly spaced from the inner surface 26 of the receptacle wall, providing for free sliding introduction and removal of the partition as well as an annular drainage aperture or space about the platform.

Additional drainage apertures 56, preferably in the nature of circular holes, are provided in spaced relation along an elongate extent paralleling the outer peripheral edge 50 of the platform 46 in inwardly spaced relation thereto. Assuming the platform 46 is circular as illustrated, the drainage apertures 56 will be arranged in a circular ring about the platform 46, or more particularly a pair of semi-circular arcs, one to each side of the handle panel.

The platform 46, or at least the upper surface thereof, outwardly and downwardly slopes from a central area to the outer periphery. This slope will be gradual for a portion thereof between the central area and the area of the drainage apertures 56. Within this area of drainage apertures 56, the slope will increase, for example by 15°, with the drainage apertures 56 at right angles therethrough whereby the desired effective drainage is provided while at the same time, the angle of the apertures to the vertical tends to restrict any tendency for implements introduce in the receptacle inadvertently falling through or jamming within the apertures. The sloping surface, outward beyond the apertures 56, returns to a minimal inclination, and in fact the upper surface of the platform 46 may have no inclination beyond the supporting spacer members 48.

Figure 4:
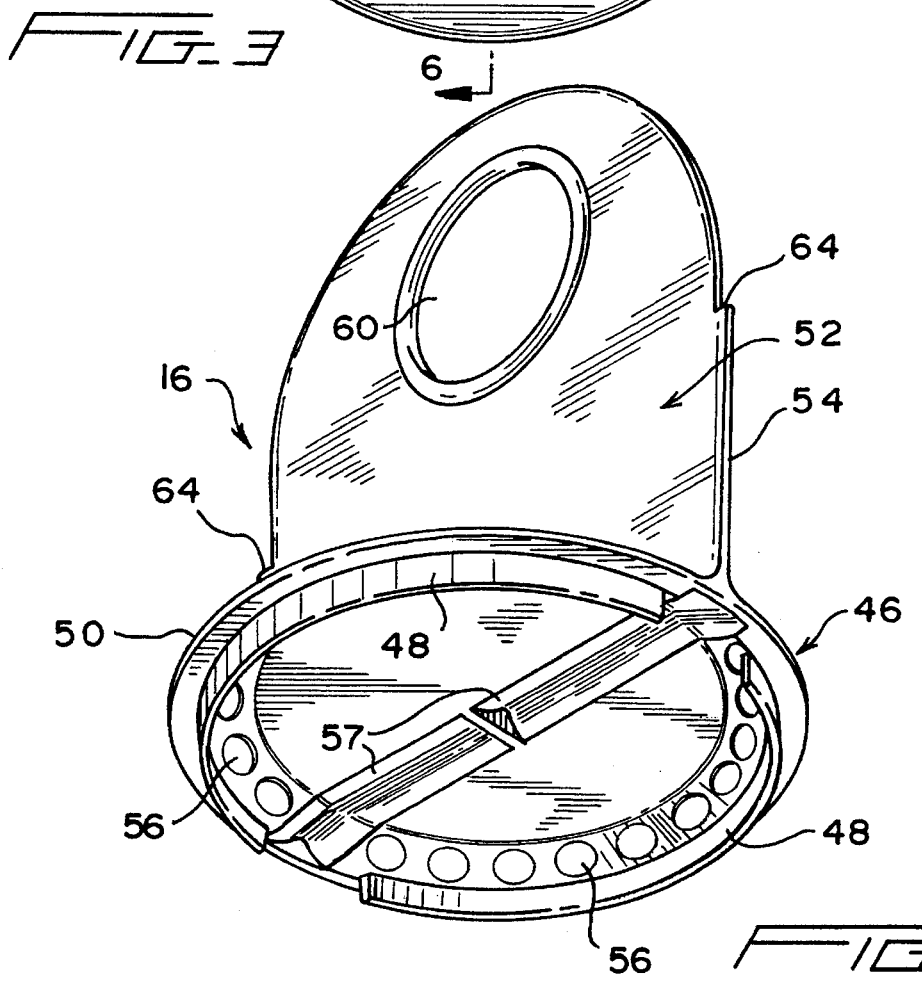
FIG. 4 is a bottom and face perspective view of the partition.

The lower edge of the handle panel 52, at the integral joinder thereof to the platform 46, is slightly widened to provide for a rigid joinder. Noting FIG. 4 in particular, aligned recesses 57 can be provided in the undersurface of the support platform 46 in this area for a reduction of materials without a corresponding weakening of the platform or joinder area.

Turning now more specifically to the handle panel 52, this panel projects upwardly through and substantially beyond the open upper mouth of the receptacle 20, terminating in an arcuate upper edge 58. The upwardly extending portion of the panel 52, centrally thereof and spaced slightly below the arcuate upper edge 58, is provided with an enlarged transverse aperture 60 therethrough peripherally surrounded by an integral enlarged bead 62 which both strengthens the aperture 60 and provides a comfortable grip for a hand or fingers inserted through the aperture 60 for manually carrying or repositioning the container.

In order to enable use of the handle panel as a means for carrying the receptacle, provision is made for releasably locking the partition 16 within the receptacle 12. Noting FIGS. 5 and 8 in particular, the upper portions of the opposed side edges 54 of the handle panel 52, at points immediately below the abutment lower edge 44 on the rim member 14, are inwardly offset to define outwardly directed and upwardly facing retaining shoulders 64 upon which the abutment edge 44 engages, thereby providing cooperative retaining means for releasably fixing the partition 16 within the chamber 26 of the receptacle. The height or location of the panel shoulders 64 is such as to engage the abutment 44 while the lower spacer or spacers 48 are fully seated on the base 18 of the receptacle 12. The transverse length of the handle panel 52, above the opposed shoulders 64, is narrower than below the shoulders 64 so as to extend freely through the rim member 14 and merge into the arcuate upper edge 58.

Noting FIG. 7, it will be seen that the container is assembled with the rim member 14 removed. First, the partition, with the support platform lowermost, is slidably introduced into the receptacle chamber through the open mouth thereof. Upon a full seating of the partition within the chamber, the rim member 14 is positioned about the upwardly projecting portion of the handle panel and moved downwardly into snap-locking engagement with the rim portion 24 of the receptacle 12. Such action engages the abutment or abutment edge 44 against the panel shoulders 64 whereby upward withdrawal of the handle panel and partition from the receptacle chamber is precluded. The platform is thus retained in position, and the handle panel 52 used as a convenient handle for the entire assembly.

The engaging shoulders mounting the rim member 14 effectively retain the partition within the receptacle under all normal loaded conditions, it being appreciated that the "load" will involve lightweight hand scrubbing implements such as brushes, sponges, scouring pads, etc. This is particularly the case in that the load forces, noting FIG. 8, will be directed toward retaining the interlock. However, the rim member can be quickly and easily released for disassembly and cleaning purposes. Release will normally be effected by a gripping of the outer bead 39 of the rim member and upwardly and inwardly flexing the rim member in a manner similar to that used in various types of snap-locked seals for containers. Upon removal of the rim member, the support platform, as an integral portion of the handle panel 52, is removed from the receptacle chamber by merely upwardly withdrawing the handle panel.

The preferred form of receptacle 12, as illustrated, is cylindrical. This in turn defines the configuration of the support platform as circular, and the rim member 14 as annular, all as illustrated. With a circular support platform 46, the drainage apertures 56 will be defined along a single or a pair of opposed arcs. Similarly, the spacing support members 48 will be arcuate. Other receptacle configurations, such as rectangular, are also contemplated, with the partition and rim member configured for accommodation within and to the receptacle.

The foregoing is considered illustrative of the invention, and as other embodiments incorporating the inventive features of the invention may occur to those skilled in the art, the disclosed embodiments are not to be considered as a limitation on the scope of the invention.

I claim:

1. A drainage container for hand-held implements, said container including a receptacle and a partition, said receptacle comprising a base and an upwardly extending wall fixed to and surrounding said base and forming an upwardly opening chamber, said wall having an upper rim portion defining an upwardly opening chamber mouth remote from said base, said partition comprising a support platform removably positioned in said chamber in overlying relation to said base for the support of implements received through said chamber mouth, spacer means for supporting said platform in closely spaced relation to and above said base in said chamber, means for allowing drainage downwardly past said platform to said base, and a handle engaged with said platform and extending upwardly through said chamber and beyond said open chamber mouth, cooperating retainer means on said wall within said chamber and on said partition for releasably fixing said partition within and against withdrawal from said chamber with said platform supported by said spacer means in said closely spaced relation to said base and with said handle extending beyond said chamber mouth to define an exposed hand grip for manual gripping of the handle and for lifting of said container, said partition being removable from said chamber by said handle upon release of said retaining means.

2. The container of claim 1 wherein said retainer means comprises a projection on said wall extending inwardly into said chamber relative to said wall, and a cooperating portion on said partition underlying said wall projection and retained thereby to fix said partition against upward movement within and relative to said chamber, and means for disengaging said wall projection and said partition portion for withdrawal and insertion of said partition from and into said chamber.

3. The container of claim 2 wherein said cooperating portion on said partition comprises a laterally extending shoulder upwardly directed toward said chamber mouth, said wall projection being mounted on said wall over said shoulder to preclude withdrawal of said partition from said receptacle chamber, said means for disengaging said wall projection and said partition portion providing for withdrawal of said wall projection from said shoulder.

4. The container of claim 3 wherein said means for disengaging comprises a rim member releasably fixed to said rim portion of said wall, said rim member extending laterally inward of said wall into said chamber to define said wall projection, said chamber mouth remaining open with said rim member thereabout, wherein removal of said rim member disengages said projection from said partition shoulder and allows removal of said partition from said chamber.

5. The container of claim 4 wherein said rim member is substantially coextensive with said rim portion, means for releasably snap-locking said rim member to said rim portion, said rim member including an inner flange within said wall, said inner flange forming a portion of the rim member which defines said wall projection.

6. The container of claim 5 including a second laterally extending shoulder on said partition remote from said first-mentioned partition shoulder and upwardly directed toward said chamber mouth, said wall projection overlying said second shoulder.

7. The container of claim 6 wherein said handle comprises a panel having opposed side edges positioned closely adjacent opposed portions of said wall, said first-mentioned and second shoulders being on said side edges respectively and immediately below said rim member flange, wherein upward movement of said partition is precluded until removal of said rim member.

8. The container of claim 3 including a second laterally extending shoulder on said partition remote from said first-mentioned partition shoulder and upwardly directed toward said chamber mouth, said wall projection overlying said second shoulder.

9. The container of claim 1 wherein said handle comprises a panel having opposed side edges positioned closely adjacent opposed portions of said wall, said cooperating retainer means comprising a projection on said wall extending inwardly relative to said wall, and an upwardly directed shoulder defined on each of said opposed side edges of said panel upwardly engaged against said projection, said projection being defined by a rim member removably engaged to said rim portion about said chamber mouth.

10. The container of claim 9 wherein said support platform generally parallels said base and has an outer periphery in closely spaced relation to said wall peripherally about said chamber to allow restricted drainage therebetween and to define said means for allowing drainage, said support platform including an upper surface sloping outwardly to define a slope generally from a central area thereto toward said outer periphery.

11. The container of claim 10 wherein said means for allowing drainage further includes multiple apertures defined through said support platform intermediate said central area and said outer periphery.

12. The container of claim 11 wherein said support platform is circular, said multiple apertures being aligned along an arc generally paralleling said outer periphery of said support platform.

13. The container of claim 12 wherein said slope has a first extent in that portion of said support platform through which said apertures are defined which is at a substantially greater angle than the remainder of said slope adjacent said central area and said outer periphery, said apertures being at substantially right angles to said first extent of said slope whereat said apertures are defined.

14. The container of claim 1 wherein said support platform includes an upper surface sloping outwardly to define a slope generally from a central area of the support platform toward an outer periphery of the support platform, said means for allowing drainage including multiple apertures defined through said support platform intermediate said central area and said outer periphery, said slope having a first extent in that portion of said support platform through which said apertures are defined which is at a substantially greater angle than the remainder of said slope adjacent said central area and said outer periphery, said apertures being at substantially right angles to said first extent of said slope whereat said apertures are defined.

15. A drainage container for hand-held implements, said container including a receptacle and a partition, said receptacle comprising a base and an upwardly extending wall sealed to and surrounding said base and forming an upwardly opening chamber, said wall having an upper rim portion defining a chamber mouth remote from said base, said partition comprising a support platform removably positioned in said chamber in overlying relation to said base for the support of implements received through said chamber mouth, spacer means for supporting said platform in closely spaced relation above said base in said chamber, means for allowing drainage downwardly past said platform to said base, and a handle engaged with said platform and extending upwardly through said chamber and beyond said chamber mouth, cooperating retainer means on said wall and said partition for releasably fixing said partition within said chamber with said platform in said closely spaced relation above said base and with said handle extending beyond said chamber mouth for access thereto beyond said container mouth, said partition being removable from said chamber upon release of said retainer means, said retainer means comprising a projection on said wall extending inwardly relative to said chamber, and a cooperating portion on said partition underlying said wall projection and retained thereby to fix said partition within said chamber, and means for disengaging said wall projection and said partition portion for withdrawal and insertion of said partition from end into said chamber, said cooperating portion on said partition comprising a laterally extending shoulder upwardly directed toward said chamber mouth, said wall projection being mounted on said wall over said shoulder to preclude withdrawal of said partition from said receptacle chamber, said means for disengaging said wall projection and said partition portion providing for withdrawal of said wall projection from said shoulder, said means for disengaging comprising a rim member releasably fixed to said rim portion of said wall, said rim member extending laterally inward of said wall into said chamber to define said wall projection, wherein removal of said rim member disengages said projection from said partition shoulder, said rim member being substantially coextensive with said rim portion, means for releasably snap-locking said rim member to said rim portion, said rim member including an inner flange within said wall, said inner flange forming a portion of the rim member which defines said wall projection, a second laterally extending shoulder on said partition remote from said first-mentioned partition shoulder and upwardly directed toward said chamber mouth, said wall projection overlying said second shoulder, said handle comprising a panel having opposed side edges positioned closely adjacent opposed portions of said wall, said first-mentioned and second shoulders being on said side edges respectively and immediately below said rim member flange, wherein upward movement of said partition is precluded until removal of said rim member, said handle, beyond said chamber mouth, including means for manual gripping of the handle and raising of said receptacle.

16. The container of claim 15 wherein said support platform generally parallels said base and has an outer periphery in closely spaced relation to said wall peripherally about said chamber to allow restricted drainage therebetween and to define said means for allowing drainage, said support platform including an upper surface sloping outwardly to define a slope generally from a central area thereto toward said outer periphery.

17. The container of claim 16 wherein said means for allowing drainage further includes multiple apertures defined through said support platform intermediate said central area and said outer periphery.

18. The container of claim 17 wherein said handle panel bisects said support platform and divides said chamber into two compartments.

19. The container of claim 18 wherein said support platform is circular, said multiple apertures being aligned along an arc generally paralleling said outer periphery of said support platform.

20. The container of claim 19 wherein said slope, in that portion of said support platform through which said apertures are defined, is at a substantially greater angle than said slope adjacent said central area and said outer periphery, said apertures being at substantially right angles to said slope whereat said apertures are defined.

* * * * *